(12) United States Patent
Yoon et al.

(10) Patent No.: US 8,094,070 B2
(45) Date of Patent: Jan. 10, 2012

(54) METHOD AND APPARATUS FOR FAST TRACKING POSITION BY USING GLOBAL POSITIONING SYSTEM

(75) Inventors: Seung-hyun Yoon, Seoul (KR); Su-bong Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 223 days.

(21) Appl. No.: 12/503,131

(22) Filed: Jul. 15, 2009

(65) Prior Publication Data

US 2010/0079339 A1 Apr. 1, 2010

(30) Foreign Application Priority Data

Sep. 30, 2008 (KR) ........................ 10-2008-0095665

(51) Int. Cl.
*G01S 19/24* (2010.01)
*G01S 19/29* (2010.01)
*G01S 19/30* (2010.01)
*G01S 19/34* (2010.01)

(52) U.S. Cl. ......... 342/357.63; 342/357.66; 342/357.68; 342/357.69; 342/357.74; 342/357.77; 342/357.78

(58) Field of Classification Search ............ 342/357.21, 342/357.22, 357.25, 357.26, 357.63, 357.68, 342/357.69, 357.74, 357.77, 357.78; G01S 19/24, G01S 19/27, 19/29, 19/30, 19/34, 19/37
See application file for complete search history.

(56) References Cited

U.S. PATENT DOCUMENTS

| 5,459,473 A * | 10/1995 | Dempster et al. ........ 342/357.25 |
| 7,561,101 B1 * | 7/2009 | Tester et al. ............. 342/357.77 |
| 7,720,104 B2 * | 5/2010 | Rao .............................. 370/498 |
| 2004/0220734 A1 * | 11/2004 | Gronemeyer ................. 701/214 |
| 2008/0117103 A1 * | 5/2008 | Wang et al. ............. 342/357.13 |
| 2008/0143591 A1 * | 6/2008 | McBurney et al. ........ 342/357.1 |
| 2008/0150797 A1 * | 6/2008 | Jia et al. .................. 342/357.06 |

FOREIGN PATENT DOCUMENTS

| JP | 8-94735 | 4/1996 |
| JP | 2001-242235 | 9/2001 |
| KR | 2008-76676 | 8/2008 |

* cited by examiner

*Primary Examiner* — Thomas Tarcza
*Assistant Examiner* — John Vigushin
(74) *Attorney, Agent, or Firm* — Staas & Halsey LLP

(57) ABSTRACT

A fast position tracking method and apparatus, the fast position tracking method including the operations of receiving a satellite signal from a plurality of satellites; demodulating satellite data received from a predetermined satellite from among the plurality of satellites by using a pseudo random noise code and a carrier which correspond to the satellite signal; estimating information about satellite data which is at a current time and which is from among the demodulated satellite data according to a real-time clock (RTC) counter; and determining a position.

19 Claims, 14 Drawing Sheets

AUTO-CORRELATION
PEAK (310)

CROSS-CORRELATION
PEAK (320)

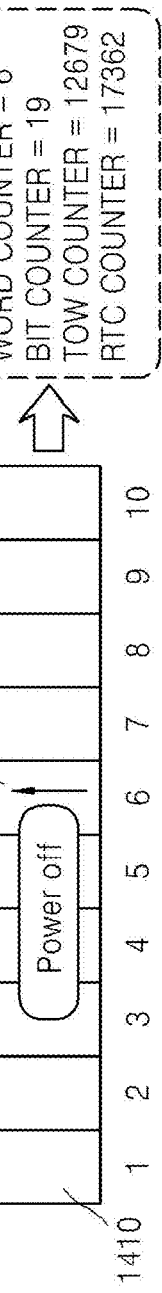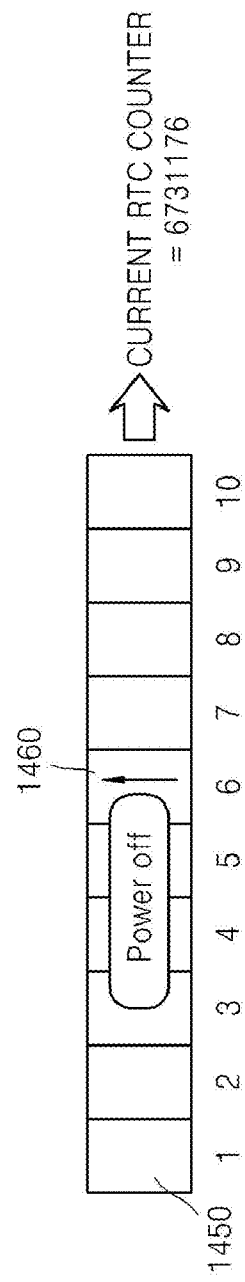
FIG. 14A
FIG. 14B

METHOD AND APPARATUS FOR FAST TRACKING POSITION BY USING GLOBAL POSITIONING SYSTEM

CROSS-REFERENCE TO RELATED APPLICATION

This application claims the benefit of Korean Patent Application No. 10-2008-0095665, filed on Sep. 30, 2008, in the Korean Intellectual Property Office, the disclosure of which is incorporated herein in its entirety by reference.

BACKGROUND OF THE INVENTION

1. Field of the Invention

An aspect of the present invention relates to a method and apparatus for tracking a position by using a global positioning system (GPS).

2. Description of the Related Art

Due to the recent rapid increase in the use of personal portable devices, there is increasing user demand for current position searching. Accordingly, a large number of personal portable devices use a global positioning system (GPS). In order for GPS-based portable devices to detect a current position, a procedure for receiving a satellite signal, searching for a satellite, analyzing satellite data, and estimating a current position is required.

SUMMARY OF THE INVENTION

An aspect of the present invention provides a method and apparatus for fast tracking a current position by using a global positioning system (GPS) and a real-time clock (RTC).

According to an aspect of the present invention, there is provided a fast position tracking method using a GPS, the fast position tracking method including the operations of receiving a satellite signal from a plurality of satellites; demodulating satellite data received from a predetermined satellite from among the plurality of satellites by using a pseudo random noise code and a carrier which correspond to the satellite signal; estimating information about satellite data which is at a current time and which is from among the demodulated satellite data according to an RTC counter; and determining a position at the current time according to the information about the satellite data at the current time.

According to another aspect of the present invention, the information about satellite data at a predetermined time may include a bit counter, a word counter, a Time-of-Week (TOW) counter, and ephemeris data which are from the satellite data at the current time.

According to another aspect of the present invention, the fast position tracking method may further include the operation of calling information about satellite data at a previous time when a position tracking operation is ended.

According to another aspect of the present invention, the operation of demodulating the satellite data may include the operations of determining a pseudo random noise code and a carrier which correspond to the predetermined satellite according to the called information about the satellite data at the previous time; and demodulating the satellite data by using the determined pseudo random noise code and the determined carrier.

According to another aspect of the present invention, the operation of estimating the information may further include the operation of estimating the information about the satellite data at the current time according to the called information about the satellite data at the previous time and the RTC counter at the current time.

According to another aspect of the present invention, the operation of estimating the information may include the operations of performing a frame lock by using the demodulated satellite data before a next preamble signal for frame synchronization of the satellite data is received; and with respect to a frame which is of the satellite data and which is generated from the frame lock, estimating information about the frame at the current time.

According to another aspect of the present invention, when a position tracking operation using the GPS is first initiated, the operation of demodulating the satellite data may include the operation of searching for the pseudo random noise code and the carrier which correspond to the satellite signal, and demodulating the satellite data received from the predetermined satellite. According to another aspect of the present invention, the operation of determining the position at the current time may include the operations of synchronizing the demodulated satellite data in units of frames, and determining the position at the current time by using the satellite data synchronized in the units of frames.

According to another aspect of the present invention, the fast position tracking method may further include the operation of storing the information about the satellite data at the current time and the RTC counter at the current time.

According to another aspect of the present invention, the fast position tracking method may further include the operations of storing information about satellite data and an RTC counter which are at a power supply shut-off time after the position tracking operation is ended; and constantly maintaining an operation of the RTC counter.

According to another aspect of the present invention, the fast position tracking method may further include the operations of updating information about satellite data and an RTC counter at predetermined intervals after the position tracking operation is ended; and storing the updated information and the updated RTC counter.

According to another aspect of the present invention, the operation of updating may include the operation of updating the information about the satellite data and the RTC counter at a corresponding time at predetermined intervals after the position tracking operation is ended.

According to another aspect of the present invention, the fast position tracking method may further include the operation of updating the ephemeris data according to the validity of current ephemeris data.

According to another aspect of the present invention, the operation of updating the ephemeris data may include the operations of checking the validity of the current ephemeris data; and when the current ephemeris data is invalid, demodulating satellite data from a newly received satellite signal, completing a new set of ephemeris data, and updating the ephemeris data.

According to another aspect of the present invention, the operation of determining the position at the current time may include the operations of estimating a pseudo-range of the predetermined satellite by considering a difference between the RTC counter at the current time and at a GPS standard time; searching for an intersection of pseudo-ranges of a predetermined number of satellites from among the plurality of satellites; and determining the intersection of the pseudo-ranges of the predetermined number of satellites as the position at the current time.

According to another aspect of the present invention, the operation of estimating the pseudo-range may include the operations of determining a difference between a frame synchronization time at a current position and a frame synchronization time at the predetermined satellite following the GPS standard time and allowing the difference to follow the GPS standard time; and determining the pseudo-range of the predetermined satellite according to the difference between the frame synchronization times.

According to another aspect of the present invention, the operation of estimating the information may include the operation of determining an interval between the RTC counter at the current time and an RTC counter at the previous time by considering an error due to a resolution of the RTC.

According to another aspect of the present invention, the operation of estimating the information may include the operation of determining the bit counter, the word counter, and the TOW counter which are from the satellite data at the current time according to the interval between the RTC counter at the current time and the RTC counter at the previous time.

According to another aspect of the present invention, the operation of estimating the information may include the operation of correcting the bit counter and the word counter, which are from the satellite data at the current time, by considering Doppler information of the predetermined satellite.

According to another aspect of the present invention, the operation of correcting the bit counter and the word counter may include the operation of correcting the bit counter and the word counter which are of the satellite data at the current time by using a Doppler frequency of the predetermined satellite at a previous time when the position tracking operation is ended.

According to another aspect of the present invention, the operation of correcting the bit counter and the word counter may include the operations of estimating a Doppler frequency at a current time by using the Doppler frequency of the predetermined satellite at the previous time when the position tracking operation is ended; and correcting the bit counter and the word counter, which are from the satellite data at the current time, by considering an average value between the estimated Doppler frequency at the current time and the Doppler frequency at the previous time.

According to another aspect of the present invention, the operation of correcting the bit counter and the word counter may include the operation of using Doppler information acquired when the pseudo random noise code and the carrier are determined.

According to another aspect of the present invention, there is provided a fast position tracking method using a GPS, the fast position tracking method including the operations of receiving a satellite signal from a plurality of satellites; demodulating satellite data received from a predetermined satellite from among the plurality of satellites by using a pseudo random noise code and a carrier which correspond to the satellite signal; according to an error due to a resolution of an RTC, referring to information about satellite data at a previous time when a position tracking operation is ended, and thus estimating information about satellite data at a current time when a position tracking operation is performed; and determining a position at the current time according to the information about the satellite data at the current time.

According to another aspect of the present invention, there is provided a fast position tracking method using a GPS, the fast position tracking method including the operations of receiving a satellite signal from a plurality of satellites; demodulating satellite data received from a predetermined satellite from among the plurality of satellites by using a pseudo random noise code and a carrier which corresponds to the satellite signal; according to Doppler information about the predetermined satellite, referring to information about satellite data at a previous time when a position tracking operation is ended, and thus estimating information about satellite data at a current time when a position tracking operation is performed; and determining a position at the current time according to the information about the satellite data at the current time.

According to another aspect of the present invention, the operation of estimating the information may include the operation of correcting the information about the satellite data at the current time by using a Doppler frequency of the predetermined satellite at the previous time.

According to another aspect of the present invention, the operation of estimating the information may include the operations of estimating a Doppler frequency at the current time by using the Doppler frequency of the predetermined satellite at the previous time; and correcting the information about the satellite data at the current time by using an average value between the estimated Doppler frequency at the current time and the Doppler frequency at the previous time.

According to another aspect of the present invention, there is provided a GPS fast position tracking apparatus including a GPS signal processing unit receiving a satellite signal from a plurality of satellites, and demodulating satellite data received from a predetermined satellite from among the plurality of satellites by using a pseudo random noise code and a carrier which correspond to the satellite signal; a satellite information estimating unit estimating information about satellite data which is from among the demodulated satellite data and which is at a current time when a position tracking operation is performed, according to an RTC counter of the GPS fast position tracking apparatus; and a current position determining unit determining a position at the current time according to the information about the satellite data at the current time.

According to another aspect of the present invention, there is provided a GPS fast position tracking apparatus including an RTC to which power is constantly supplied; a GPS signal processing unit receiving a satellite signal from a plurality of satellites, determining a pseudo random noise code and a carrier which correspond to the satellite signal, and demodulating satellite data received from a predetermined satellite from among the plurality of satellites; a power control unit controlling power supplied to the GPS signal processing unit; a storage unit storing information about satellite data at a predetermined time; and a current position deriving unit estimating information about satellite data which is from among the demodulated satellite data and which is at a current time when a position tracking operation is performed, according to the RTC counter, and thus determining a position at the current time according to the information about the satellite data at the current time.

According to another aspect of the present invention, there is provided a computer readable recording medium having recorded thereon a program for executing the fast position tracking method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 14A and 14B illustrate information about satellite data at a predetermined time and an RTC counter in a fast position tracking apparatus according to an embodiment of the present invention.

DETAILED DESCRIPTION OF THE EMBODIMENTS

Figure 1:
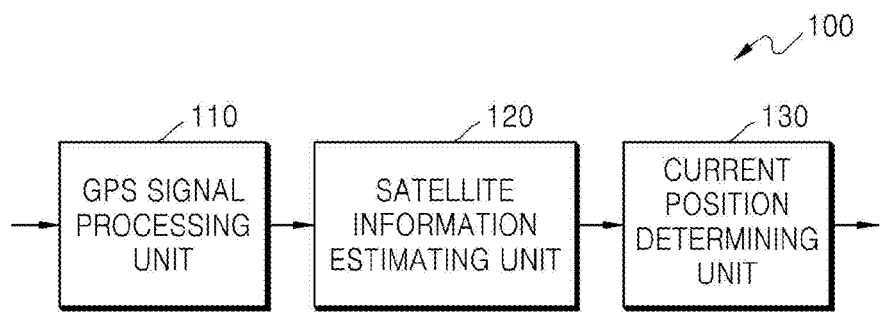
FIG. 1 is a block diagram of a global positioning system (GPS) fast position tracking apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a global positioning system (GPS) position tracking method, a fast position tracking method, and a fast position tracking apparatus according to embodiments of the present invention will be described more fully with reference to FIGS. 1 through 15, in which exemplary embodiments of the invention are shown.

FIG. 1 is a block diagram of a GPS fast position tracking apparatus 100 according to an embodiment of the present invention.

The GPS fast position tracking apparatus 100 according to the embodiment of FIG. 1 includes a GPS signal processing unit 110, a satellite information estimating unit 120, and a current position determining unit 130. Also, the GPS fast position tracking apparatus 100 may further include a real-time clock (RTC) (not shown).

The GPS signal processing unit 110 receives various satellite signals from a plurality of satellites, and demodulates satellite data from the received satellite signals. The GPS signal processing unit 110 searches for a pseudo random noise code and a carrier which correspond to the satellite signals, and selects a usable satellite signal from among the received various satellite signals, thereby demodulating the satellite data from the selected satellite signal.

When a pseudo random noise code and a carrier which correspond to a predetermined satellite are determined according to ephemeris data with respect to satellite data at a previous time, the GPS signal processing unit 110 may perform a code lock and a carrier lock, and when the satellite data is demodulated by using a pseudo random noise code and a carrier, the GPS signal processing unit 110 may perform a bit lock.

The satellite information estimating unit 120 may estimate information about satellite data at a current time from among the satellite data demodulated by the GPS signal processing unit 110, according to an RTC counter.

Information about satellite data at a predetermined time may include a bit counter, a word counter, a Time-of-Week (TOW) counter, and ephemeris data which are at the predetermined time.

The satellite information estimating unit 120 may estimate the information about the satellite data at the current time by using information about satellite data at a previous time and an RTC counter at a current time. The satellite information estimating unit 120 may receive the information about the satellite data at the previous time from a storage unit (not shown) of the GPS fast position tracking apparatus 100 or from an external device (not shown) connected to the GPS fast position tracking apparatus 100.

A procedure of estimating the information about the satellite data at the current time will be described later with reference to FIG. 14.

When the GPS signal processing unit 110 performs the code lock, the carrier lock, and the bit lock, the satellite information estimating unit 120 may declare a frame lock (by which a necessary frame is detected) without receiving a next preamble signal for frame synchronization of satellite data. With respect to a frame of the satellite data generated by the frame lock, the satellite information estimating unit 120 may estimate a bit counter, a word counter, a TOW counter, and the like, about the frame at a current time.

The current position determining unit 130 determines a position at the current time according to the information about the satellite data at the current time, wherein the information is estimated by the satellite information estimating unit 120.

The current position determining unit 130 may include a satellite pseudo range estimating unit (not shown) estimating a pseudo range of a predetermined satellite, and a navigation value deriving unit (not shown) determining a position at the current time by using pseudo ranges of satellites. The satellite pseudo range estimating unit (not shown) may estimate the pseudo range of the predetermined satellite by considering a difference between the RTC counter at the current time and at a GPS standard time. The navigation value deriving unit (not shown) may search for intersection of pseudo ranges of a predetermined number of satellites from which signals are received and which are from among a plurality of satellites, and may determine the intersection of the pseudo ranges of the predetermined number of satellites as the position at the current time.

The satellite pseudo range estimating unit (not shown) may determine a difference between a frame synchronization time of the GPS signal processing unit 110 and a frame synchronization time of a predetermined satellite following the GPS standard time, and may determine the pseudo range of the predetermined satellite by using the difference between the frame synchronization times. In this regard, the satellite pseudo range estimating procedure will be described later with reference to FIG. 13.

When the GPS fast position tracking apparatus 100 using the GPS first initiates a position tracking operation, the GPS signal processing unit 110 searches for and determines the pseudo random noise code and the carrier which correspond to the satellite signals, searches the corresponding satellite, and demodulates the satellite data of the corresponding satellite. The current position determining unit 130 synchronizes the demodulated satellite data in units of frames, and tracks a position at the current time by using the satellite data synchronized in the units of frames. That is, when the position tracking operation is first initiated, a wait time is necessary to receive all data required for the position tracking operation.

The GPS fast position tracking apparatus 100 may further include the storage unit (not shown) storing information about satellite data at a predetermined time and an RTC counter at a predetermined time. That is, a bit counter, a word counter, a TOW counter, and the RTC counter may be stored in the storage unit (not shown).

The GPS signal processing unit 110 may acquire the pseudo random noise code and the carrier which correspond to the predetermined satellite without searching for them by using the information about the satellite data at the previous time, wherein the information is stored in the storage unit (not shown), and may demodulate the satellite data.

When the position tracking operation is ended, if the GPS fast position tracking apparatus 100 receives a power supply shut-off command in the GPS signal processing unit 110, the GPS fast position tracking apparatus 100 may store information about satellite data and an RTC counter at a power supply shut-off time in the storage unit (not shown). Even if the power supply is shut-off to the GPS signal processing unit 110, power has to be constantly supplied to an RTC (not shown).

The GPS fast position tracking apparatus 100 may further include a satellite information and RTC counter updating unit (not shown) updating information about satellite data and an RTC counter at predetermined intervals after the position tracking operation is ended. The satellite information and RTC counter updating unit (not shown) stores the updated information about the satellite data and the updated RTC counter in the storage unit (not shown).

Operations of the GPS fast position tracking apparatus 100 will be described later with reference to FIGS. 10A and 10B.

After the position tracking operation is ended and the power supply is shut-off to the GPS signal processing unit 110, the GPS fast position tracking apparatus 100 may resume the power supply to the GPS signal processing unit 110 at predetermined intervals.

The satellite information and RTC counter updating unit (not shown) may update the information about the satellite data and the RTC counter to information about satellite data and an RTC counter at a time when the GPS signal processing unit 110 is resumed, and may store the newly updated information about the satellite data and the RTC counter in the storage unit (not shown). Operations of the GPS signal processing unit 110 while the power supply is shut-off will be described later with reference to FIG. 11.

The GPS fast position tracking apparatus 100 may further include an ephemeris data updating unit (not shown) updating ephemeris data according to the validity of current ephemeris data. The ephemeris data updating unit (not shown) may include an ephemeris data validity checking unit (not shown) checking the validity of the current ephemeris data.

When the ephemeris data updating unit (not shown) determines that current ephemeris data is invalid, and when the GPS signal processing unit 110 is supplied power and operates, the GPS signal processing unit 110 receives a new satellite signal, and completes a new set of ephemeris data corresponding to satellite data demodulated from the received new satellite signal. Accordingly, the ephemeris data updating unit (not shown) may update the current ephemeris data to the new set of ephemeris data.

When the ephemeris data updating unit (not shown) determines that current ephemeris data is invalid, and when the GPS signal processing unit 110 is not supplied power, the GPS fast position tracking apparatus 100 may allow the power to be supplied to the GPS signal processing unit 110 so that the GPS signal processing unit 110 resumes its operation. After that, the GPS signal processing unit 110 may receive a new satellite signal, and complete a new set of ephemeris data corresponding to satellite data demodulated from the received new satellite signal. The ephemeris data updating unit (not shown) may update the current ephemeris data by using the new set of ephemeris data.

Operations related to updating ephemeris data will be described later with reference to FIG. 12.

In order to precisely estimate position information, the satellite information estimating unit 120 may determine an interval between the RTC counter at the current time and an RTC counter at the previous time by considering an error due to resolution of the RTC. Based on the interval between the RTC counter at the current time and the RTC counter at the previous time, the satellite information estimating unit 120 determines the bit counter, the word counter, and the TOW counter which are included in the satellite data at the current time.

The satellite information estimating unit 120 may further include a Doppler-based correcting unit (not shown) correcting the bit counter and the word counter which are included in the satellite data at the current time by considering Doppler information of the predetermined satellite. The Doppler-based correcting unit (not shown) may correct the bit counter and the word counter which are included in the satellite data at the current time by using a Doppler frequency of the predetermined satellite at a previous time when a position tracking operation is ended.

Otherwise, the Doppler-based correcting unit (not shown) may estimate a Doppler frequency at a current time by using the Doppler frequency of the predetermined satellite at the previous time, and may correct the bit counter and the word counter which are included in the satellite data at the current time by considering an average value between the estimated Doppler frequency at the current time and the Doppler frequency at the previous time.

The Doppler-based correcting unit (not shown) may use Doppler information acquired when the GPS signal processing unit 110 determines the pseudo random noise code and the carrier.

In order to perform a position tracking operation according to GPS, it is necessary to receive satellite signals from four or more satellites from among 24 satellites. According to a trilateration method using pseudo ranges measured by the received satellite signals, an intersection of the pseudo ranges with respect to the four or more satellites is determined as a current position. A pseudo range of a satellite corresponds to a value $((A-B) \times C)$ that is obtained by multiplying the speed of light C by a difference A−B between a time A when a satellite signal is transmitted from the satellite and a time B when the satellite signal reaches a GPS receiver.

Thus, it is necessary to search for satellites which can transmit signals to a current position. In order to search for a satellite, a two-dimensional (2D) search method using a Coarse/Acquisition (C/A) code is used, and at this time, the satellite may be identified via a pseudo random noise code search and a Doppler search.

Figure 2:
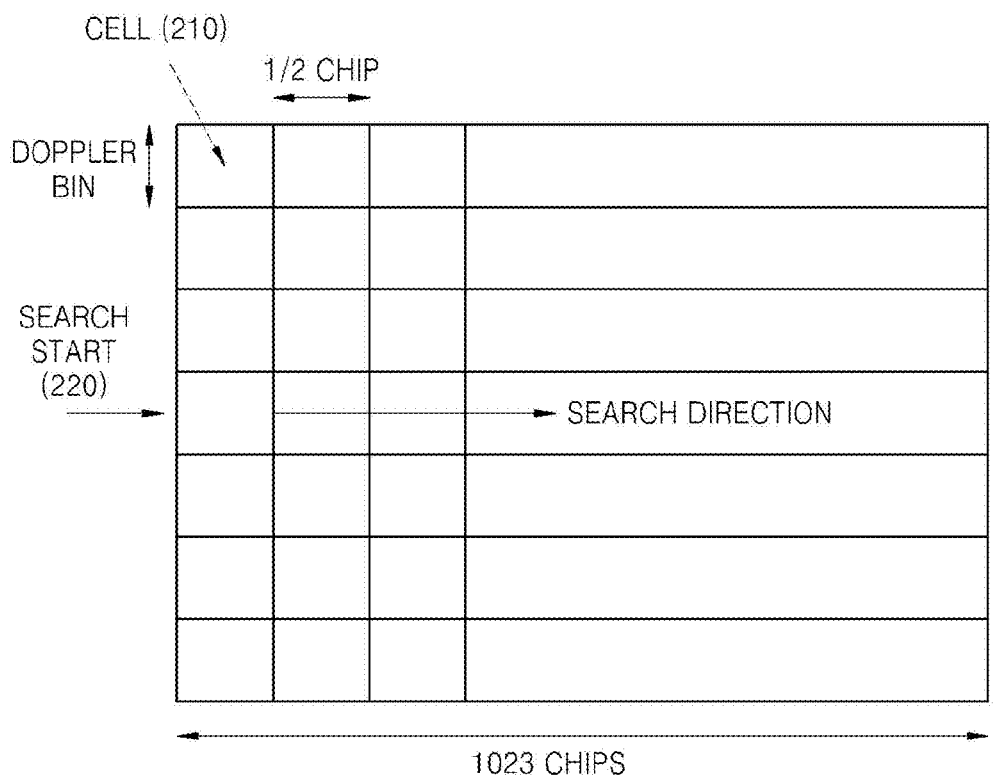
FIG. 2 is a conceptual diagram of a two-dimensional (2D) search method using a Coarse/Acquisition (C/A) code of a GPS.

FIG. 2 is a conceptual diagram of a 2D search method using a C/A code of a GPS.

The 2D search method via a pseudo random noise code search and a Doppler search uses a correlation between a reference satellite signal and a received satellite signal. The reference satellite signal corresponding to the received satellite signal is searched for by delaying a code by as much as a ½ chip unit (an explanation related to the ½ chip unit will now be described. In digital communications, a chip is a pulse of a Direct-Sequence Spread Spectrum (DSSS) code, such as a pseudo-noise code sequence used in direct-sequence code division multiple access (CDMA) channel access techniques) in the time domain, and by varying a frequency magnitude by as much as a Doppler bin unit corresponding to a Doppler frequency in the frequency domain. The Doppler frequency is reflected in a carrier.

Referring to FIG. 2, the reference satellite signal is determined per each cell 210. Each pseudo random noise code has a sequence of 1023 chips, and a Doppler effect considered by the GPS is in a Doppler frequency range of ±10 KHz. Thus, 41 Doppler bins, each having a unit of a 500 Hz resolution are required. The reference satellite signal is searched for by varying the code and the carrier by as much as the ½ chip unit along a time axis and by as much as the Doppler bin unit (that is, by as much as 500 Hz) along a frequency axis in a search direction, wherein the search is started from a search start cell 220 corresponding a Doppler expected value.

In general, satellites are estimated and allocated to 12 channels of a user's GPS receiver, and then a satellite searching operation is started. That is, the 2D search method via the pseudo random noise code search and the Doppler search is repeated a maximum of 12 times to perform the satellite searching operation.

Figure 3A:
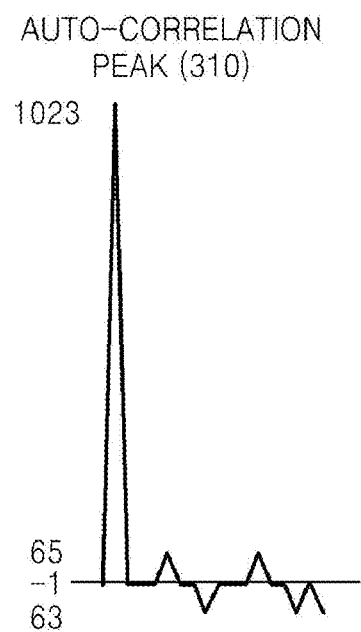
FIGS. 3A and 3B are diagrams illustrating a correlation between a C/A code of a GPS and a satellite signal.
Figure 3B:

FIGS. 3A and 3B are diagrams illustrating a correlation between a C/A code of a GPS and a satellite signal.

As illustrated in FIG. 3A, if a reference satellite signal is searched for according to the 2D search method using the C/A code of FIG. 2, a correlation between the reference satellite signal and a received satellite signal exhibits an auto-correlation peak 310. On the other hand, as illustrated in FIG. 3B, if an appropriate reference satellite signal is not found, the correlation between the reference satellite signal and the received satellite signal exhibits a cross-correlation peak 320.

Figure 4:
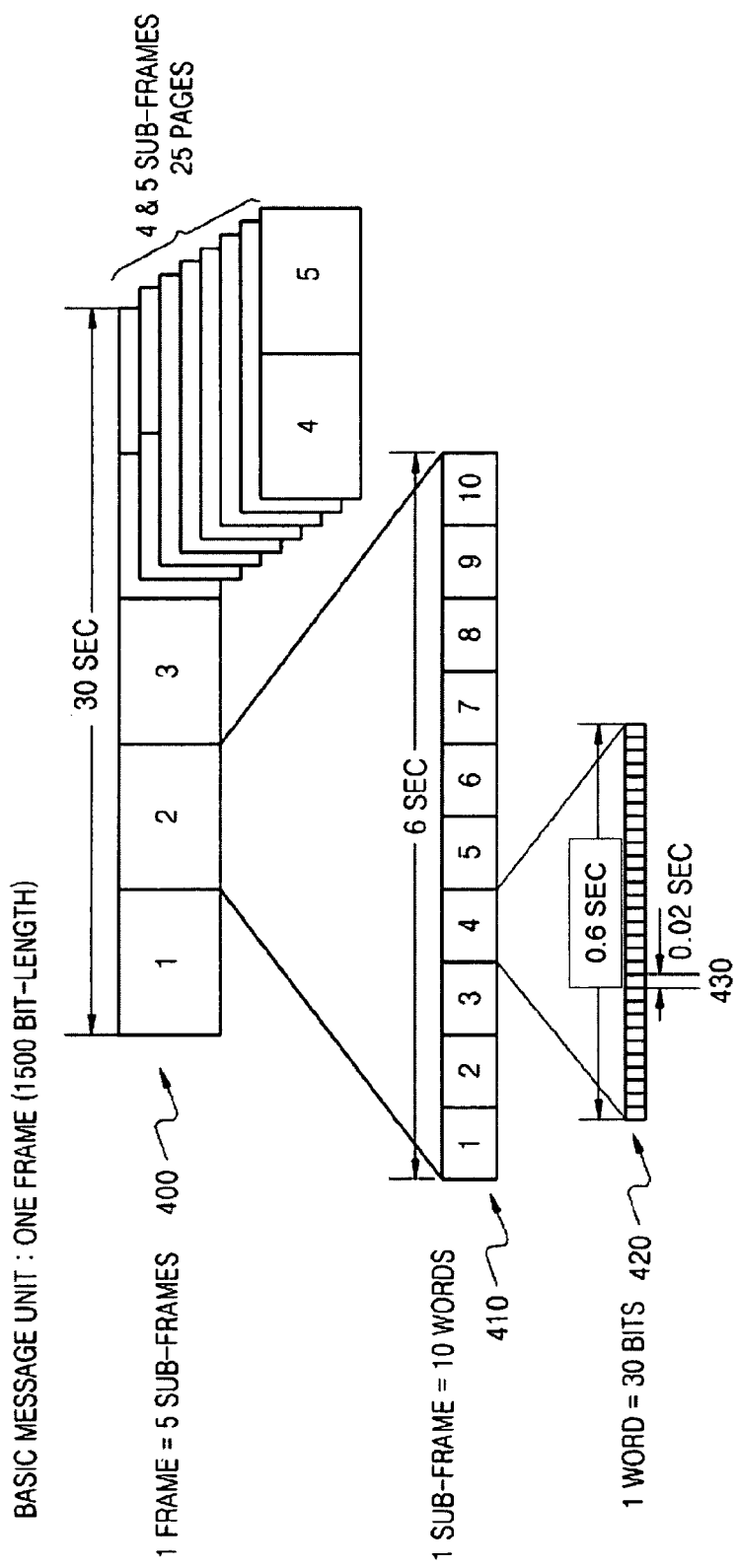
FIG. 4 is a diagram of a structure of satellite data according to a GPS.
Figure 5:
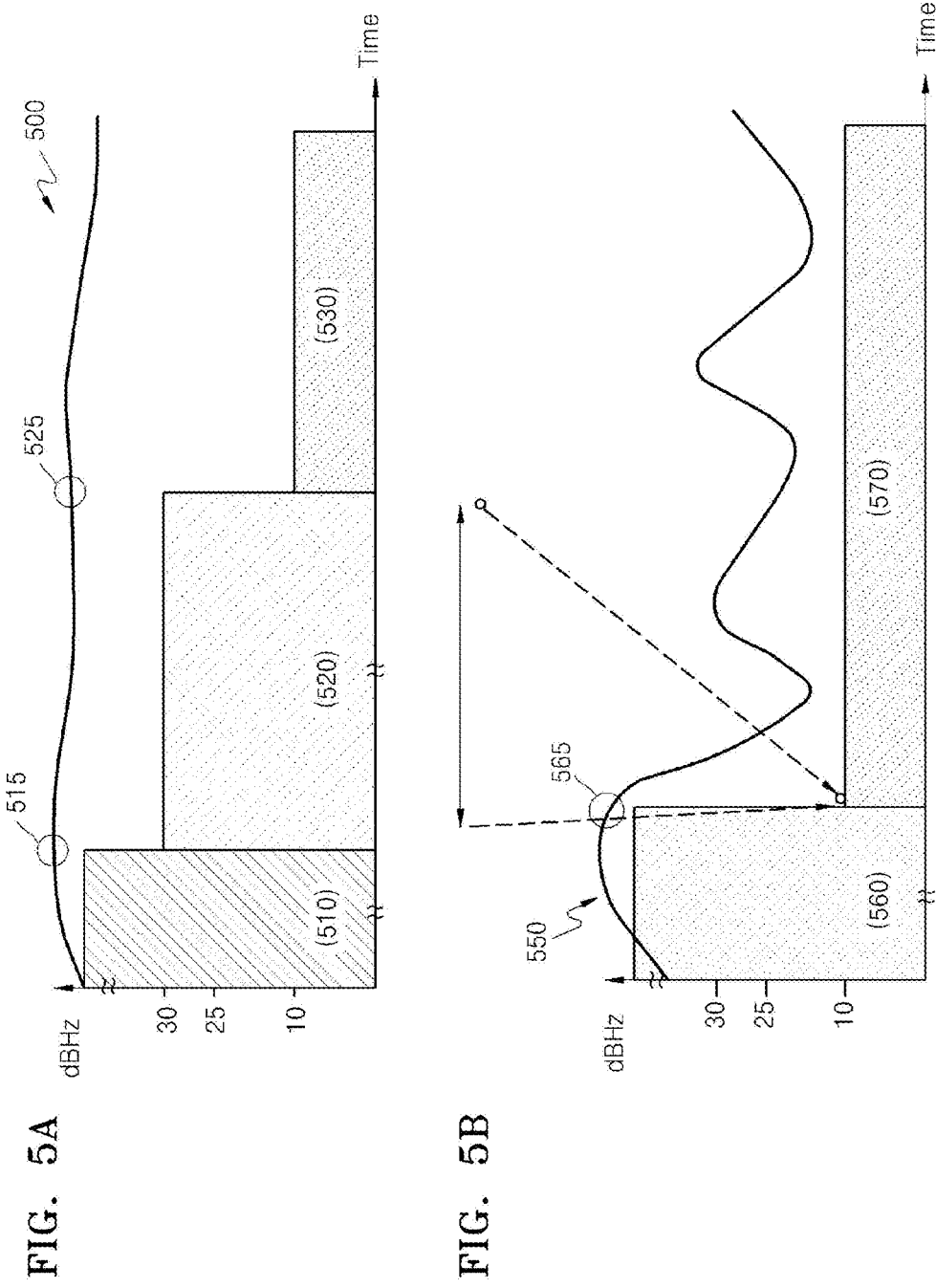
FIGS. 5A and 5B illustrate a general cold start and another cold start, indicated via auxiliary information, which are related to a GPS position tracking operation.
Figure 6:
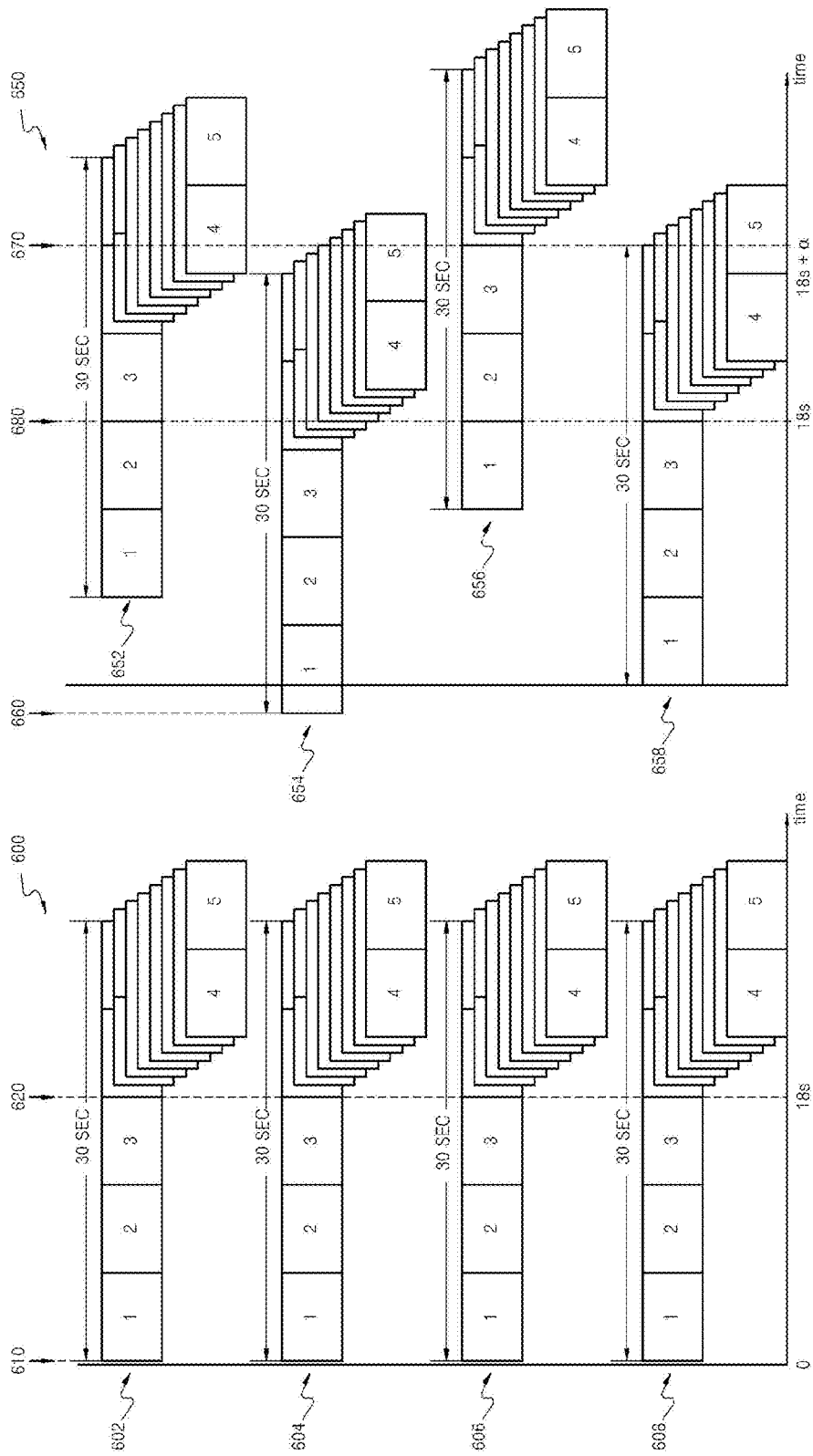
FIGS. 6A and 6B illustrate synchronization of data received from a plurality of satellites via a GPS.

FIG. 4 is a diagram of a structure of satellite data according to a GPS.

A unit of a basic message of the satellite data is a frame 400 that corresponds to a length of 1500 bits.

The frame 400 includes 5 sub-frames 410. Each sub-frame 410 includes 10 words 420, and each word 420 corresponds to 30 bits 430. Since a satellite data transmission rate is about 50 bps, a transmission time with respect to transmission of the frame 400 is about 30 seconds, and the transmission time with respect to transmission of the sub-frame 410, the word 420, and the bit 430 is respectively about 6 seconds, 0.6 seconds, and 0.02 seconds.

From among the 5 sub-frames composing the frame 400, a first sub-frame includes information for correction of a clock of an individual satellite, and second and third sub-frames include individual satellite information containing ephemeris data about the individual satellite. The ephemeris data may be used to correct a clock error of a GPS receiver.

Fourth and fifth sub-frames are information that is selectively transmitted, and includes all satellite information containing Almanac data. A master frame including a plurality of frames 400 includes a plurality of fourth and fifth sub-frames corresponding to 25 pages, and thus, the master frame corresponds to 37500 bits and it takes 12.5 minutes to transmit the master frame.

FIGS. 5A and 5B illustrate a general cold start and another cold start, indicated via auxiliary information, which are related to a GPS position tracking operation.

As illustrated in FIG. 5A, in the general cold start, when a receiver initially starts a GPS position tracking operation 530 by using a received satellite signal 500, the receiver first requires a time corresponding to a satellite signal searching period 510 starting from a receiver operation start point, and the receiver requires an additional time corresponding to a satellite searching and ephemeris data receiving period 520 starting from a satellite signal searched point 515. After that, a position tracking period 530 may start from a valid ephemeris data received point 525.

In general, previously received ephemeris data and differential Almanac correction data are valid during a predetermined time period. Hence, if ephemeris data and differential Almanac correction data are not received from a satellite whenever a position tracking operation starts, a time period from a receiver operation start point to a position tracking operation start point may be saved. Since information about a current usable satellite can be detected via ephemeris data and differential Almanac correction data, a satellite may be immediately allocated to the receiver without performing a satellite searching operation, and a time taken to receive ephemeris data information from the satellite may be reduced.

As illustrated in FIG. 5B, in the other cold start considering ephemeris data and differential Almanac correction data, when a satellite signal 550 is received, and when a satellite signal searching period 560 ends after passing a receiver operation start point, a satellite signal searching point 565 may be started and at the same time, a position tracking period 570 may be advanced and performed by using the previously stored ephemeris data and differential Almanac correction data.

FIGS. 6A and 6B illustrate synchronization of data 600 and 650 received from a plurality of satellites via a GPS.

As illustrated in FIG. 6A, in order to perform a position tracking operation, 4 pieces of satellite data 602, 604, 606, and 608 respectively received from at least 4 satellites are required. Thus, theoretically, a minimum time period from a satellite data reception start point 610 to a satellite data reception completion time 620 necessary for a Time to First Fix (TTFF) is about 18 seconds.

However, since 4 satellites are not in a same position, a reception start point varies according to 4 pieces of satellite data 652, 654, 656, and 658, as illustrated in FIG. 6B. Thus, frame synchronization for channels cannot be simultaneously performed, such that a time period from a satellite data reception start point 660 to a satellite data reception completion time 670, when satellite data necessary for a TTFF with respect to each of the 4 satellites is received, exceeds 18 seconds 680.

In a normal cold start environment, the time period from the satellite data reception start point 660 to the satellite data reception completion time 670 is about 35 seconds.

Figure 7:
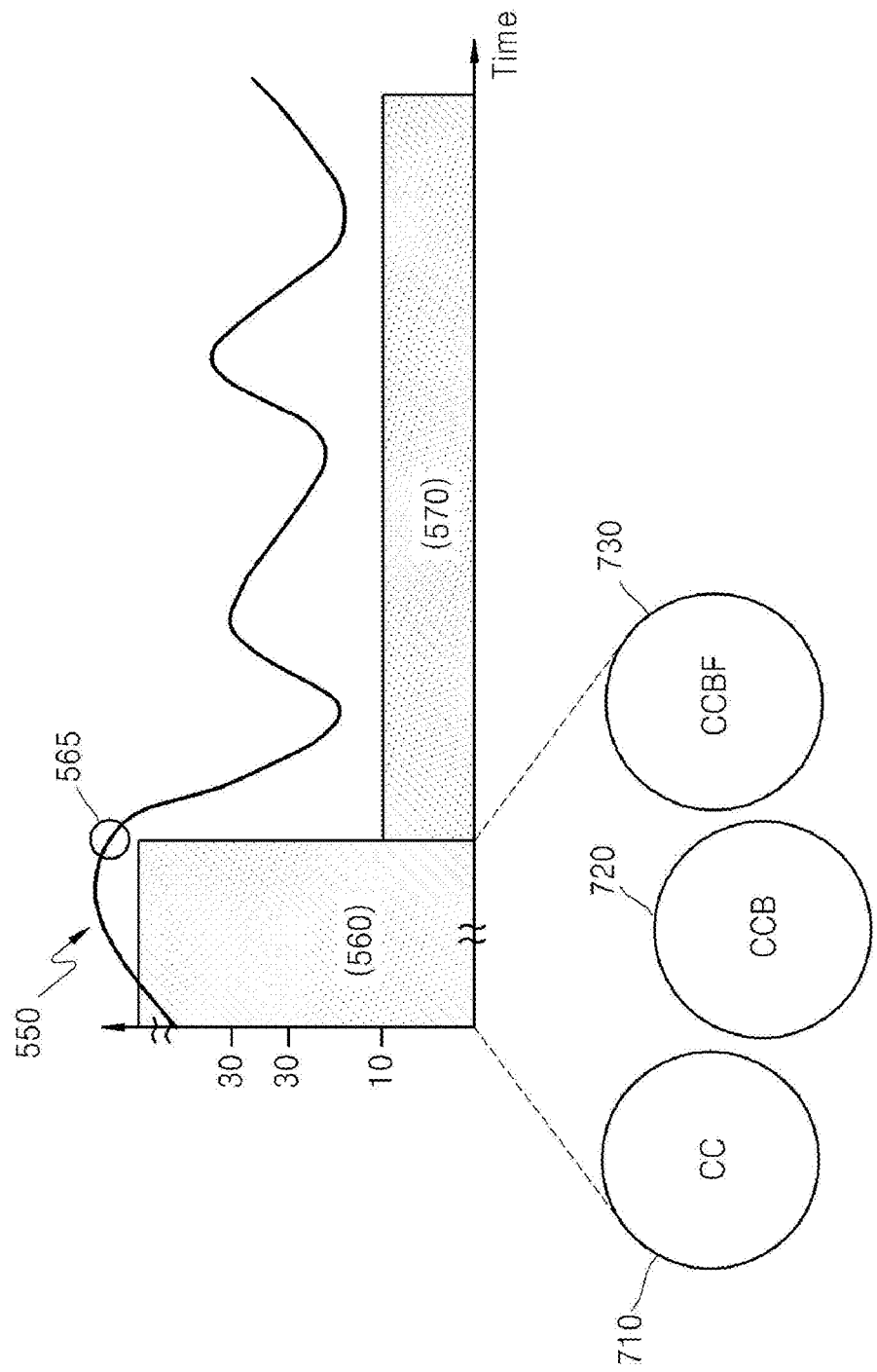
FIG. 7 illustrates operations that are performed before a satellite data searching operation is started by a GPS.

FIG. 7 illustrates operations that are performed before a satellite data searching operation is started by a GPS.

As described above with reference to FIGS. 5A and 5B, it may not be necessary to receive the ephemeris data and differential Almanac correction data but the satellite signal searching period 560 still exists. In order to search for a satellite signal, C/A code and carrier acquisition 710, bit synchronization 720, and frame synchronization 730 have to be completed. It takes about 1 or 2 seconds to perform the C/A code and carrier acquisition 710, it takes about a maximum of 0.5 seconds to perform the bit synchronization 720, and it takes about 1.2 to about 6 seconds to perform the frame synchronization 730.

If stored ephemeris data is used instead of constantly receiving the ephemeris data from a satellite, information about a satellite at a corresponding time is extracted from the stored ephemeris data so that a time taken to perform a code lock and a carrier lock for the C/A code and carrier acquisition 710, and a time taken to perform a bit lock for the bit synchronization 720 may be saved.

However, a GPS satellite inserts a preamble signal for frame synchronization into a start part of a sub-frame, and transmits the preamble signal. Thus, the preamble signal is transmitted every 6 seconds, so that it is not possible to save a time taken to receive the preamble signal required to perform the frame synchronization 730.

Figure 8:
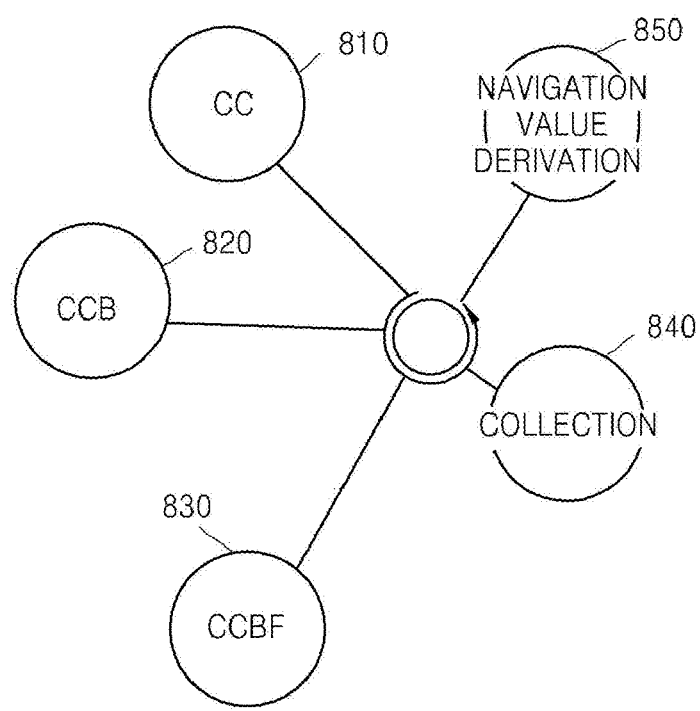
FIG. 8 illustrates operations that are performed before a current position tracking operation is started by a GPS.

FIG. 8 illustrates operations that are performed before a current position tracking operation is started by a GPS.

In order to perform a current position tracking operation according to a general GPS, a navigation value corresponding to a current position has to be derived (850). In order to derive the navigation value (850), C/A code and carrier acquisition 810, bit synchronization 820, frame synchronization 830, and ephemeris data and differential Almanac correction data collection 840 have to be completed, and in total it takes about 30 seconds.

Hereinafter, a fast position tracking method and apparatus according to an aspect of the present invention will be described with reference to FIGS. 9 through 15. The fast position tracking method and apparatus may skip the frame synchronization 830 and the ephemeris data and differential Almanac correction data collection 840, and may reduce a time taken to perform the C/A code and carrier acquisition 810. According to one or more embodiments of the present invention, it may be possible to derive the navigation value (850) in about 1 or 2 seconds, and it may not be necessary to separately establish a network infrastructure to separately store data from a satellite and then to transfer the data to a user or a GPS receiver.

Figure 9:
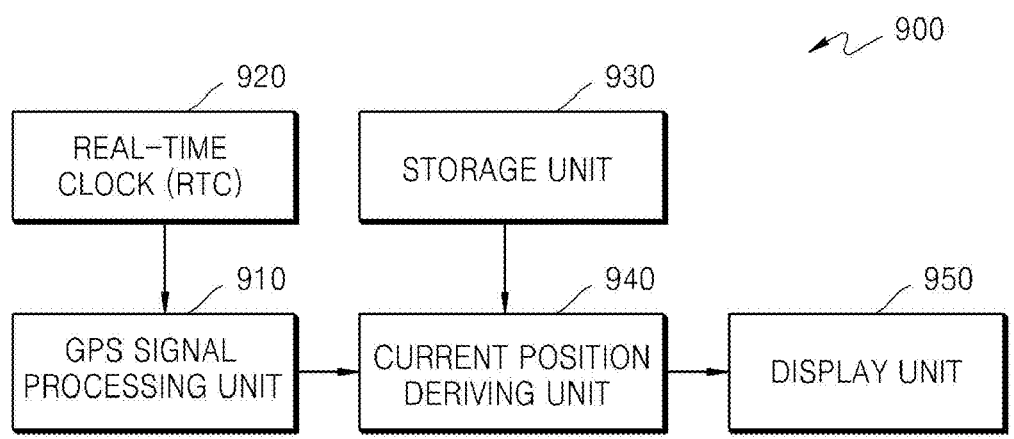
FIG. 9 is a block diagram of a fast position tracking apparatus using a GPS according to another embodiment of the present invention.

FIG. 9 is a block diagram of a fast position tracking apparatus 900 using a GPS according to another embodiment of the present invention.

The fast position tracking apparatus 900 using the GPS according to the embodiment of FIG. 9 includes a GPS signal processing unit 910, an RTC 920, a storage unit 930, a current position deriving unit 940, and a display unit 950.

The GPS signal processing unit 910 receives a satellite signal from a plurality of satellites, acquires a pseudo random noise code and a carrier via correlation of the satellite signal, searches for a satellite signal, and demodulates satellite data. The GPS signal processing unit 910 may use or store an RTC input counter value.

The RTC 920 provides the GPS signal processing unit 910 with an RTC counter at a frequency of 32.768 kHz. Even if power supply is shut-off to the GPS signal processing unit 910, the power supply is not shut-off to the RTC 920.

The fast position tracking apparatus 900 may further include a power control unit (not shown) controlling the power supply to the GPS signal processing unit 910. The power control unit (not shown) may shut-off or resume the power supply to the GPS signal processing unit 910 so as to check an existence of a current position tracking command or to update various kinds of information.

The storage unit 930 may store counter information about satellite data at a predetermined time, ephemeris information, Almanac information, RTC counter information, and the like, which are necessary to calculate a navigation value.

The current position deriving unit 940 receives satellite data and the RTC counter from the GPS signal processing unit 910, and receives information about satellite data at a previous time and the ephemeris information from the storage unit 930. The current position deriving unit 940 may derive a navigation value and thus may determine a current position by using the RTC counter information, the information about the satellite data at the previous time, the ephemeris information, etc.

The display unit 950 may display an image signal on a display screen, or may reproduce an audio signal via a speaker, wherein the image signal or the audio signal corresponds to a processing result by the current position deriving unit 940.

Figure 10A:
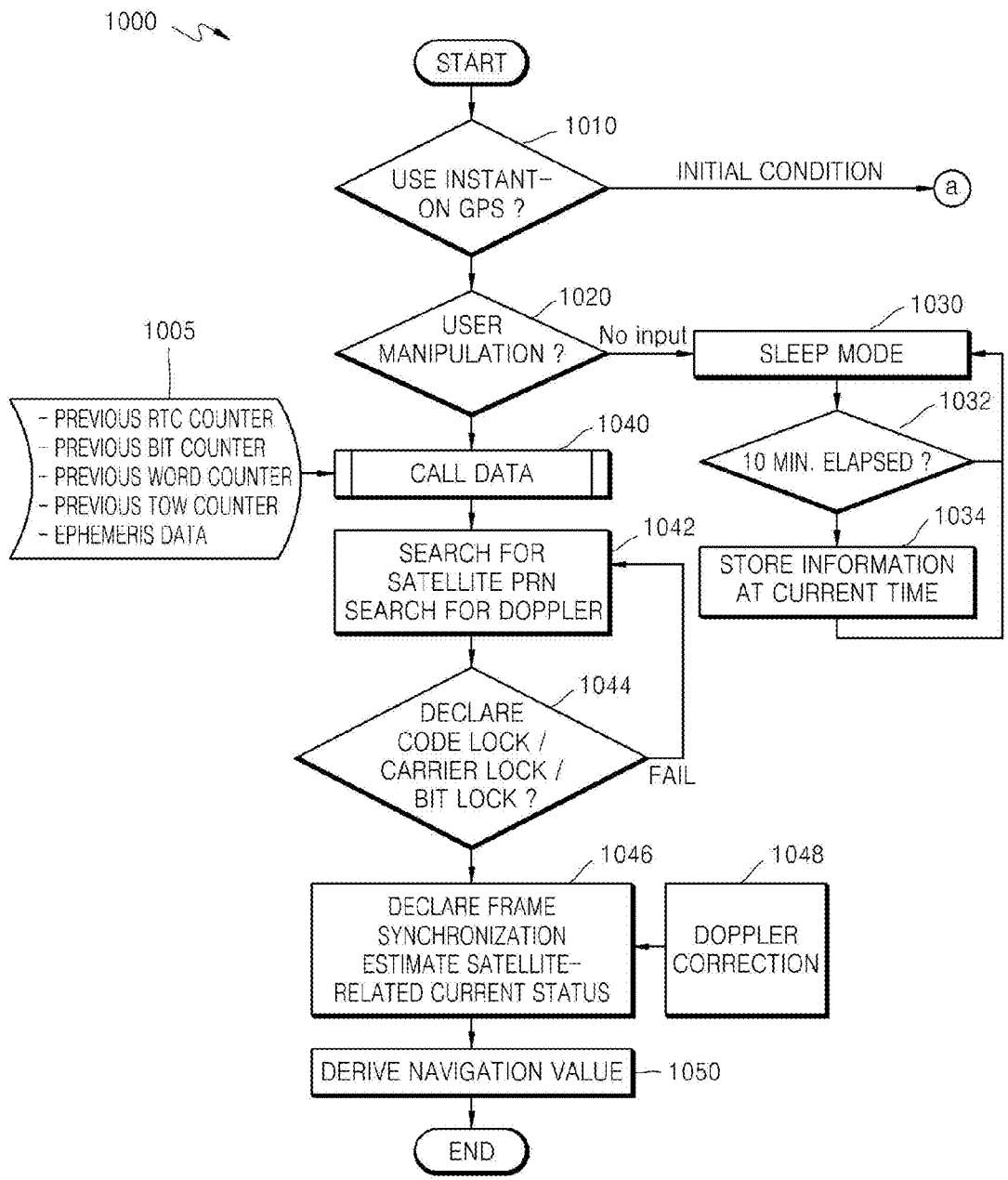
FIGS. 10A and 10B are related to a flowchart of a fast position tracking method performed by a fast position tracking apparatus, according to an embodiment of the present invention.
Figure 10B:
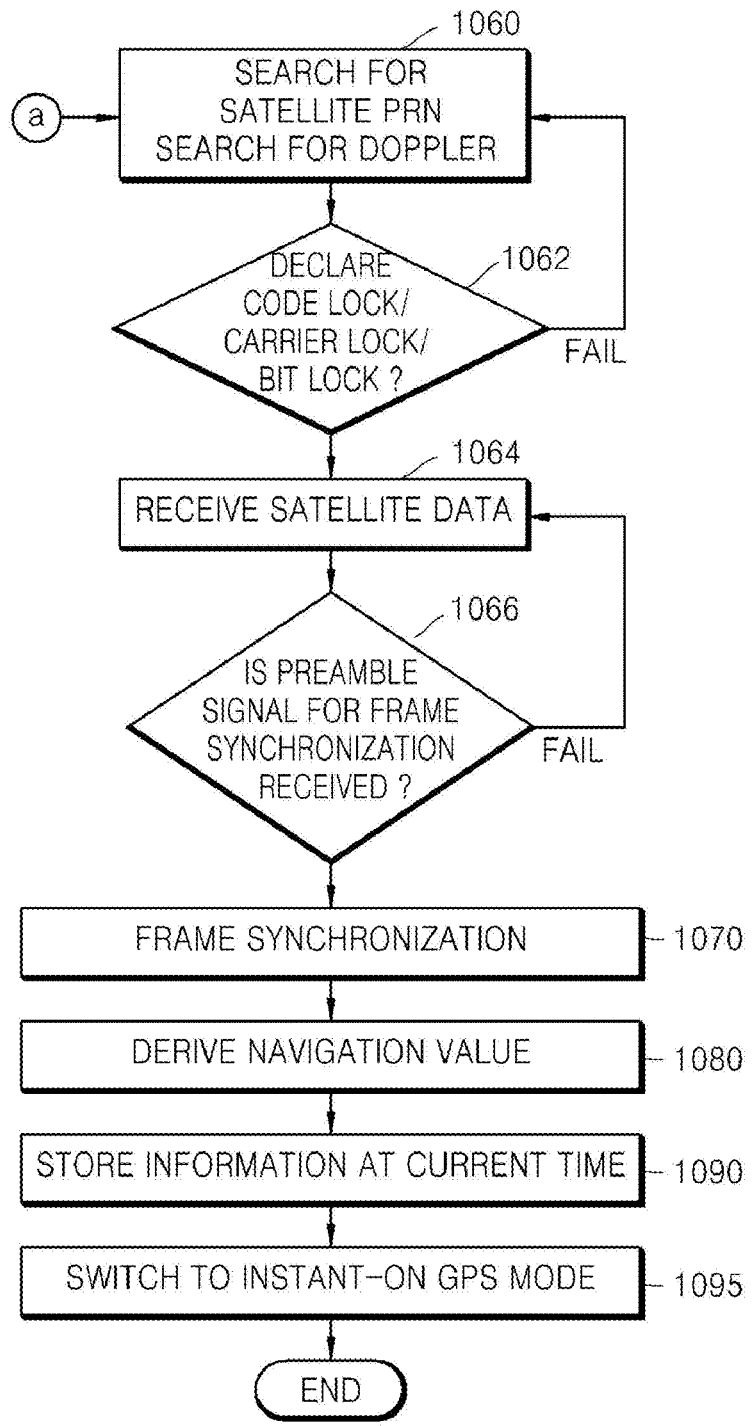

FIGS. 10A and 10B are related to a flowchart 1000 of a fast position tracking method performed by a fast position tracking apparatus 900, according to an embodiment of the present invention.

The fast position tracking apparatus 900 determines whether to use a fast position tracking system (referred to as 'Instant-On GPS') (operation 1010). If the fast position tracking apparatus 900 is in an initial state in which ephemeris information and the like necessary for a position tracking operation are not stored therein, the fast position tracking method proceeds to operation 1060. Otherwise, if the fast position tracking system is used, the fast position tracking method proceeds to operation 1020.

It is determined whether user manipulation occurs in the fast position tracking apparatus 900 (operation 1020). The user manipulation may be a manipulation for resuming a power supply with respect to a GPS signal processing unit 910 so as to start a fast position tracking operation. If no user manipulation occurs, the fast position tracking method proceeds to operation 1030. Otherwise, if the user manipulation occurs, the fast position tracking method proceeds to operation 1040.

The GPS signal processing unit 910 calls data for the fast position tracking operation from a storage unit 930 (operation 1040). The GPS signal processing unit 910 calls a group 1005 including a previous RTC counter, a previous bit counter, a previous word counter, a previous TOW counter, and ephemeris data from the storage unit 930.

The GPS signal processing unit 910 performs a pseudo random noise code search and a Doppler search by using ephemeris data (operation 1042). When the pseudo random noise code search and the Doppler search are ended, the GPS signal processing unit 910 determines whether a code lock, a carrier lock, and a bit lock are declared (operation 1044). If the declaration fails, the fast position tracking method returns to operation 1042 and the GPS signal processing unit 910 re-performs the pseudo random noise code search and the Doppler search. If the declaration succeeds, the fast position tracking method proceeds to operation 1046.

A current position deriving unit 940 declares that frame synchronization is performed without receiving a preamble signal for frame synchronization via satellite data, and estimates a satellite-related current status by using the previous RTC counter, the previous bit counter, the previous word counter, and the previous TOW counter which were called in operation 1040 (operation 1046). The current position deriving unit 940 may estimate a current bit counter, a current word counter, and a current TOW counter by using the previous RTC counter, the previous bit counter, the previous word counter, the previous TOW counter, and a current RTC counter.

When the current position deriving unit 940 estimates information about satellite data at the current time, a correction may be performed by considering a Doppler value (operation 1048).

The current position deriving unit 940 may derive a navigation value by using the information about the satellite data at the current time, and may estimate the current position (operation 1050). The current position deriving unit 940 may use the current bit counter, the current word counter, and the current TOW counter, may change a receiver time according to a GPS standard time, and thus may calculate a pseudo range of a satellite. An intersection of pseudo ranges may be determined as the navigation value.

If the user manipulation does not occur in operation 1020, the fast position tracking apparatus 900 is switched to a sleep mode (operation 1030). In the sleep mode, an existence of the user manipulation is checked at predetermined intervals, for example, every 10 minutes (operation 1032). While the sleep mode continues, the information about the satellite data at the current time is stored in the storage unit 930 (operation 1034). At this time, the information about the satellite data at the current time to be stored is the current bit counter, the current word counter, the current TOW counter, and the current RTC counter. In the sleep mode, although the GPS signal processing unit 910 does not operate, an RTC 920 has to constantly operate.

As illustrated in FIG. 10B, if the fast position tracking apparatus 900 is in the initial state in which the ephemeris information and the like, which are necessary for the position tracking operation, are not stored therein, the GPS signal processing unit 910 performs a pseudo random noise code search and a Doppler search based on a 2D search method on all channels so as to search for a satellite (operation 1060). When the pseudo random noise code search and the Doppler search are ended, it is determined whether a code lock, a carrier lock, and a bit lock are declared (operation 1062). If the code lock, the carrier lock, and the bit lock are successfully declared, the fast position tracking method proceeds to operation 1064. However, if the code lock, the carrier lock, and the bit lock are not declared, the fast position tracking method returns to operation 1060, and the pseudo random noise code search and the Doppler search are re-performed.

After the code lock, the carrier lock, and the bit lock are declared, the GPS signal processing unit 910 receives corresponding satellite data (operation 1064). The GPS signal processing unit 910 checks whether a preamble signal for frame synchronization is included in the received satellite data (operation 1066). If the preamble signal for frame synchronization is not received, the fast position tracking method returns to operation 1064, and the GPS signal processing unit 910 constantly receives the corresponding satellite data. If the preamble signal for frame synchronization is received, the GPS signal processing unit 910 declares the frame synchronization (operation 1070).

The current position deriving unit 940 calculates a navigation value by using the received satellite data and the RTC counter (operation 1080). After deriving the navigation value, the current position deriving unit 940 stores the information about the satellite data at the current time (operation 1090).

After deriving the navigation value at the initial state (operation 1080), and storing the information (operation 1090), the fast position tracking apparatus 900 may be switched from the sleep mode to an Instant-On GPS mode (operation 1095).

Figure 11:
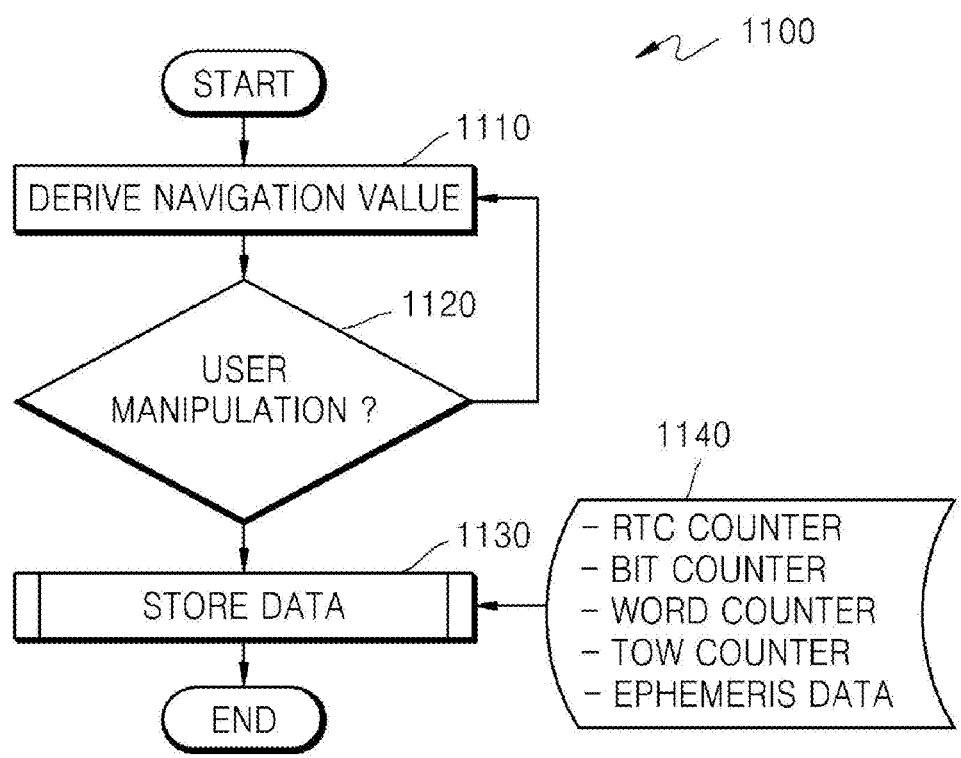
FIG. 11 is a flowchart of an operational procedure in a fast position tracking apparatus when a power supply to a GPS signal processing unit is shut-off, according to another embodiment of the present invention.

FIG. 11 is a flowchart 1100 of an operational procedure in a fast position tracking apparatus 900 when power supply to a GPS signal processing unit 910 is shut-off, according to another embodiment of the present invention.

A current position deriving unit 940 of the fast position tracking apparatus 900 calculates a navigation value (operation 1110), and it is determined whether a user manipulation related to power supply shut-off occurs (operation 1120). If no user manipulation occurs, the current position deriving unit 940 constantly calculates a navigation value (operation 1110). If the user manipulation occurs, the fast position tracking apparatus 900 shuts off the power supply to the GPS signal processing unit 910.

Although the power supply to the GPS signal processing unit 910 is shut-off, an RTC 920 constantly operates. When the power supply is shut-off, the fast position tracking apparatus 900 stores a group 1140 including an RTC counter, a bit counter, a word counter, a TOW counter and ephemeris data in a storage unit 930 (operation 1130).

By storing various satellite-related data at a time of the power supply shut-off, a position tracking operation start point may be advanced when power supply is resumed to start a position tracking operation at a next time. For example, since ephemeris information includes individual satellite information, when the position tracking operation is resumed, a satellite channel search time may be saved by using the previously stored ephemeris information. Also, when the position tracking operation is resumed, the RTC counter, the bit counter, the word counter and the TOW counter which are of the time of the power supply shut-off, as well as an RTC counter at a corresponding current time, may be used in calculation of a navigation value.

Figure 12:
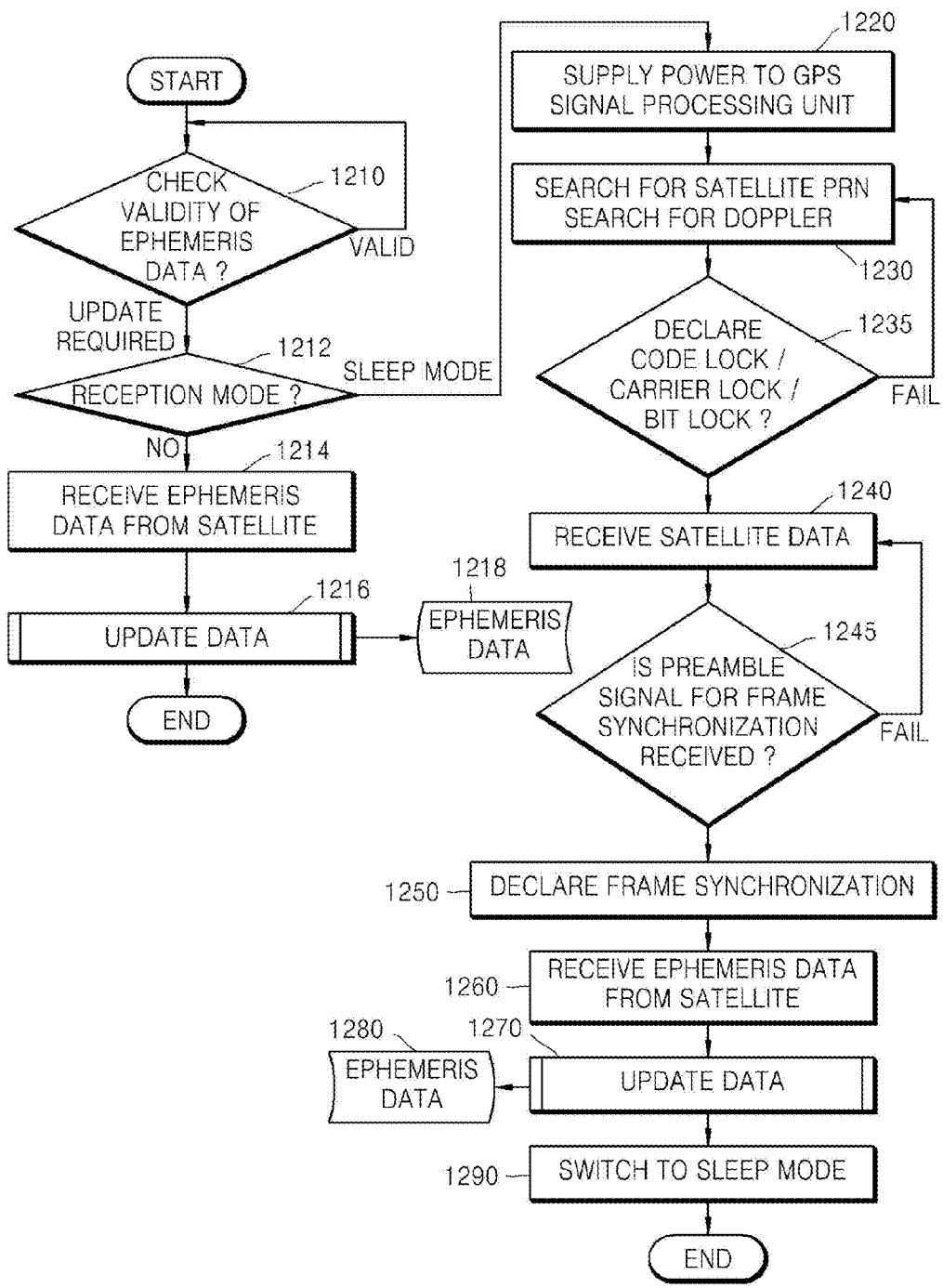
FIG. 12 is a flowchart of an ephemeris data updating operation procedure in a fast position tracking apparatus, according to another embodiment of the present invention.

FIG. 12 is a flowchart 1200 of an ephemeris data updating operation procedure in a fast position tracking apparatus 900, according to another embodiment of the present invention.

Since previously received ephemeris data is valid for about 4 hours, the ephemeris data has to be updated after a predetermined time period. Thus, the fast position tracking apparatus 900 may update the ephemeris data at predetermined intervals by using an ephemeris data updating unit (not shown).

The ephemeris data updating unit (not shown) determines whether the ephemeris data is valid (operation 1210). If the ephemeris data is still valid, the validity is re-checked after a predetermined time period (operation 1210). If the ephemeris data is no longer valid so that it is necessary to update the ephemeris data, it is checked whether power is constantly supplied to a GPS signal processing unit 910 so that the GPS signal processing unit 910 is currently able to receive satellite data (operation 1212).

If the GPS signal processing unit 910 is currently able to receive the satellite data, the GPS signal processing unit 910 receives at least a set of ephemeris data from a satellite (operation 1214). It takes more than about 30 seconds to receive and complete the set of ephemeris data from a basic message formed in units of frames.

The ephemeris data updating unit (not shown) stores the received ephemeris data in a storage unit 930, and thus updates satellite-related information for a position tracking operation (operation 1216).

In operation 1212, if the power is not supplied to the GPS signal processing unit 910, the fast position tracking apparatus 900 re-supplies the power to the GPS signal processing unit 910 (operation 1220).

The GPS signal processing unit 910 performs a pseudo random noise code and a Doppler search (operation 1230), and the fast position tracking apparatus 900 determines whether a satellite search is ended by the pseudo random noise code and the Doppler search of the GPS signal processing unit 910, and thus, a code lock, a carrier lock, and a bit lock are declared (operation 1235). If the code lock, the carrier lock, and the bit lock are not declared, the GPS signal processing unit 910 re-performs the pseudo random noise code and the Doppler search (operation 1230).

If the code lock, the carrier lock, and the bit lock are declared, the GPS signal processing unit 910 receives satellite data (operation 1240). In order to complete ephemeris data, the GPS signal processing unit 910 has to receive the satellite data for about 30 seconds or longer. Until a preamble signal for frame synchronization is received via the received satellite data (operation 1245), the GPS signal processing unit 910 constantly receives the satellite data (operation 1240).

When the preamble signal for frame synchronization is received, the fast position tracking apparatus 900 declares frame synchronization (operation 1250), and the GPS signal processing unit 910 receives ephemeris data from a satellite (operation 1260). The ephemeris data updating unit (not shown) stores the newly received ephemeris data in the storage unit 930 (operation 1280), and thus updates the satellite-related information (operation 1270). When update of the ephemeris data is ended, the fast position tracking apparatus 900 switches a mode of the GPS signal processing unit 910 into a sleep mode (operation 1290).

Figure 13:
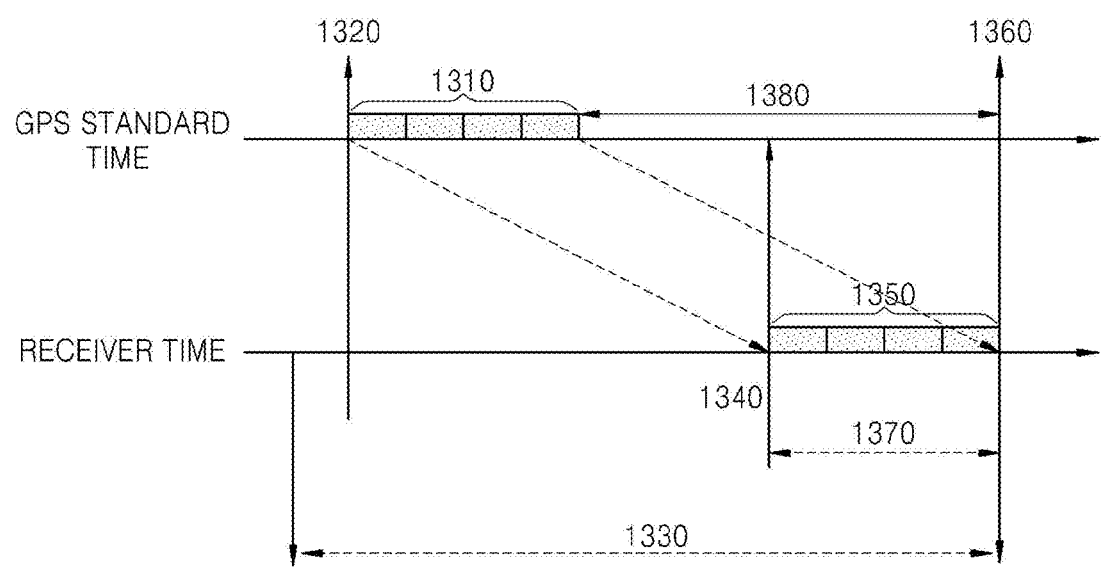
FIG. 13 illustrates an operational procedure for determining a pseudo range of a satellite, performed by a GPS.

FIG. 13 illustrates an operational procedure for determining a pseudo range of a satellite, performed by a GPS.

A clock of the satellite is synchronized with a GPS standard time. The satellite transmits a sub-frame every 6 seconds, and in this regard, the satellite always transmits the sub-frame at XX.00 seconds (that is, at a point of time when decimal point values less than 1 become zero).

A clock of the GPS signal processing units 110 and 910 according to embodiments of the present invention, or a clock of a receiver of a user is an RTC but the clock is not always synchronized with the GPS standard time. The receiver generates a TIC in every 100 ms period 1330.

In order to derive a navigation value of a current position, a current position determining unit 130 or a current position deriving unit 940 uses a trilateration method which makes use of a pseudo range of a satellite. The pseudo range of the satellite corresponds to a value ((A−B)×C) obtained by multiplying the speed of light C by a difference A−B between a time A when a satellite signal is transmitted from the satellite and a time B when the satellite signal reaches a GPS receiver.

Referring to FIG. 13, satellite data is transmitted at XX.00 seconds according to the GPS standard time 1320, and the satellite data is received by the receiver at a frame synchronization time in the clock of the receiver 1340. Thus, a difference 1380 between a time of transmission of satellite data 1310 during a predetermined period and a time of reception of satellite data 1350 during a predetermined period may be estimated as a transmission delay time period 1380. The transmission delay time period 1380 corresponds to the aforementioned difference A−B between the time A when the satellite signal is transmitted from the satellite and the time B when the satellite signal reaches the receiver. Thus, the pseudo range of the satellite is calculated by multiplying the transmission delay time period 1380 by a time constant, that is, the speed of light C.

In order to estimate the transmission delay time period 1380 between the time of transmission in the predetermined period of satellite data 1310 and the time of reception in the predetermined period of satellite data 1350, it is necessary to define the predetermined period of satellite data 1350. The predetermined period of satellite data 1350 indicates a code time 1370 corresponding to a period from the frame synchronization time in the clock of the receiver 1340 to a next TIC generation time 1360. Thus, the transmission delay time period 1380 corresponds to a differential period estimated by excluding a period as much as the code time 1370 from a period between the next TIC generation time 1360 and a time when the satellite data is transmitted from the satellite (refer to reference numeral 1320 in FIG. 13).

In order to estimate the transmission delay time period 1380, the receiver counts the code time 1370. However, the code time 1370 follows the clock of the receiver while the time when the satellite data is transmitted from the satellite 1320 follows the GPS standard time. Thus, an RTC of the receiver has to be changed according to the GPS standard time by using satellite data at the next TIC generation time 1360.

In order to change the RTC of the receiver according to the GPS standard time, it is necessary to correct a receiver clock offset (RCO). A week-based RCO (RCO.wk) and a second-based RCO (RCO.sec) may be respectively calculated by using Equation 1 and Equation 2.

$$RCO.wk = ZT.wk - WN \qquad \text{[Equation 1]}$$

$$RCO.sec = ZT.sec + SyncTIC \times 0.1 - (TOW \times 6.0 + 0.075) \qquad \text{[Equation 2]}$$

where, ZT.wk and ZT.sec respectively indicate a week-based time of the receiver and a second-based time of the receiver when $0^{th}$ TIC is generated. SyncTIC indicates a value representing an order of TIC generated in a next frame synchronization time. TOW or WN (week number) indicates information about a frame synchronization time, and is periodically transmitted from a satellite.

The current position determining unit 130 and the current position deriving unit 940 may change an RTC counter to the GPS standard time by using the RCO, may estimate the transmission delay time period 1380, and may calculate a pseudo range of a satellite. Although the power supply is shut-off to the GPS signal processing units 110 and 910, or although the GPS signal processing units 110 and 910 are in a sleep mode, the fast position tracking apparatuses 100 and 900 according to the embodiments of the present invention may immediately recognize an RTC counter at a time when the GPS signal processing units 110 and 910 resume their operations, by using the RTC that constantly operates.

Also, a satellite information estimating unit 120 and the current position deriving unit 940 may estimate satellite-related current information by using satellite-related previous information that is stored with a current RTC counter value in a storage unit when the power supply is shut-off, and thus may estimate values such as ZT, SyncTIC, TOW, WN, and the like, which are necessary in Equation 1 and Equation 2.

Accordingly, the satellite information estimating unit 120 and the current position deriving unit 940 may estimate the information about the satellite data at a current time so as to declare frame synchronization without receiving a preamble signal for frame synchronization, and as a result, a time taken to derive a navigation value may be reduced in the current position determining unit 130 and the current position deriving unit 940.

FIGS. 14A and 14B illustrate information about satellite data at a predetermined time and an RTC counter in fast position tracking apparatuses 100 and 900 according to embodiments of the present invention. With reference to FIGS. 14A and 14B, a method of estimating satellite-related current information by using satellite-related previous information will be described, wherein the method is performed by a satellite information estimating unit 120 and a current position deriving unit 940.

Received sub-frames 1410, illustrated in FIG. 14A, and received sub-frames 1450 illustrated in FIG. 14B, include 10 words, and numbers at lower ends of the sub-frames 1410 and 1450 denote an order of each word. A plurality of pieces of information 1430 at a previous time 1420 when power supply is shut-off, are stored. According to the plurality of pieces of information 1430, a word counter indicates 6, a bit counter indicates 19, a TOW counter indicates 12679, and an RTC counter indicates 17362 at the previous time 1420. A current RTC counter at a current time 1460 when power supply is resumed indicates 6731176.

If an RTC at a clock frequency of 32 kHz is used, an elapsed time period may be calculated by using an interval between the current RTC counter indicating 6731176 and the RTC counter indicating 17362. That is, the interval between the RTC counters is 6713814 (a value obtained by subtracting 17362 from 6731176). Thus, the elapsed time period between the previous time and the current time may be a value calculated by dividing the interval between the RTC counters by the clock frequency, that is, the elapsed time period may be about 209806.6875 ms (=6713814÷32 kHz).

Since it takes about 600 ms (i.e., 0.6 seconds) to transmit a word, a word transmission time period approximating to the elapsed time period (209806.6875 ms) is about 209400 ms (=600 ms/word×349 words). That is, it is possible to understand that 349 words are transmitted from a satellite during the elapsed time period between the previous time and the current time.

Since 406.6875 ms (=209806.6875 ms−209400 ms) has elapsed after the current time when a word is received, a bit transmission time period most highly approximating the current time is about 400 ms (=20 ms/bit×20 bits). Thus, it is possible to understand that 349 words and 20 bits have been transmitted during the elapsed time period. According to the bit counter and the word counter which are at the previous time, a current bit counter and a current word counter may be respectively estimated as 9 (=19+20−30≦30) and 6 (=6+9+1−10≦10).

Also, since the TOW counter indicates an offset with respect to a frame synchronization time, and since about 34 frames (≈209806.6875 ms÷6000 ms/sub-frame) have been transmitted during the elapsed time period, a current TOW counter may be estimated as about 12713 (=12679+34).

Accordingly, by using the satellite-related previous information (that is, the bit counter, the word counter, the TOW counter, and the RTC counter which are at the previous time) and the current RTC counter at the current time, the satellite-related current information (that is, the current bit counter, the current word counter, and the current TOW counter which are at the current time) may be estimated. In this manner, a satellite-related current status at the current time may be detected without receiving a preamble signal for frame synchronization. Thus, a TTFF time may be minimized.

In order to more precisely estimate the information about the satellite data at the current time, resolution of the RTC may be considered. Although the RTC at the clock frequency of 32 kHz is used in the one or more embodiments of the present invention, an error of the clock frequency of 32 kHz may be changed according to the resolution of the RTC.

For example, the clock frequency of 32 kHz of the RTC may vary in a range of ±0.002 kHz according to the resolution of the RTC. In the case where the clock frequency of the RTC varies, a result of estimating the elapsed time period between the previous time and the current time by using the satellite-related previous information may also vary.

Thus, the satellite information estimating unit 120 and the current position deriving unit 940 may previously consider a clock resolution and thus may adjust a clock frequency, thereby enhancing correctness of the satellite-related current status.

Also, in order to more precisely estimate the information about the satellite data at the current time, a Doppler frequency may be considered. A GPS transmits satellite data by using a band of 1575.42 MHz while a receiver receives a C/A code at 1.023 MHz. When the GPS transmits the satellite data, a Doppler frequency of about ±10 kHz may be generated. Thus, considering a ratio of a radio frequency (RF) band of the GPS and a signal transmission rate of the receiver, a Doppler frequency in the receiver may be about ±6.49 kHz.

For example, assuming that a mode switching period of the fast position tracking apparatuses 100 and 900 is about 10 minutes so that the fast position tracking apparatuses 100 and 900 are switched from a sleep mode to a receive mode to correct satellite-related information and then returned to the sleep mode every 10 minutes, ±3894 errors may occur in every 1.023M chip due to the Doppler frequency of ±6.49 kHz.

In order to estimate the information about the satellite data at the current time by using a Doppler frequency, a Doppler frequency at the current time is required. Thus, the satellite information estimating unit 120 and the current position deriving unit 940 may regard a Doppler frequency acquired at the previous time as the Doppler frequency at the current time, and thus may correct the information about the satellite data at the current time. The Doppler frequency acquired at the previous time may be obtained from stored ephemeris data.

Also, the satellite information estimating unit 120 and the current position deriving unit 940 may estimate the Doppler frequency at the current time by using the Doppler frequency acquired at the previous time, may regard an average value between the estimated Doppler frequency at the current time and the Doppler frequency at the previous time as the Doppler frequency at the current time, and thus may correct the information about the satellite data at the current time.

The correction by considering the resolution of the RTC or via the Doppler frequency may increase a sleep mode time period. Thus, power consumption required to receive GPS auxiliary information may be minimized.

Figure 15:
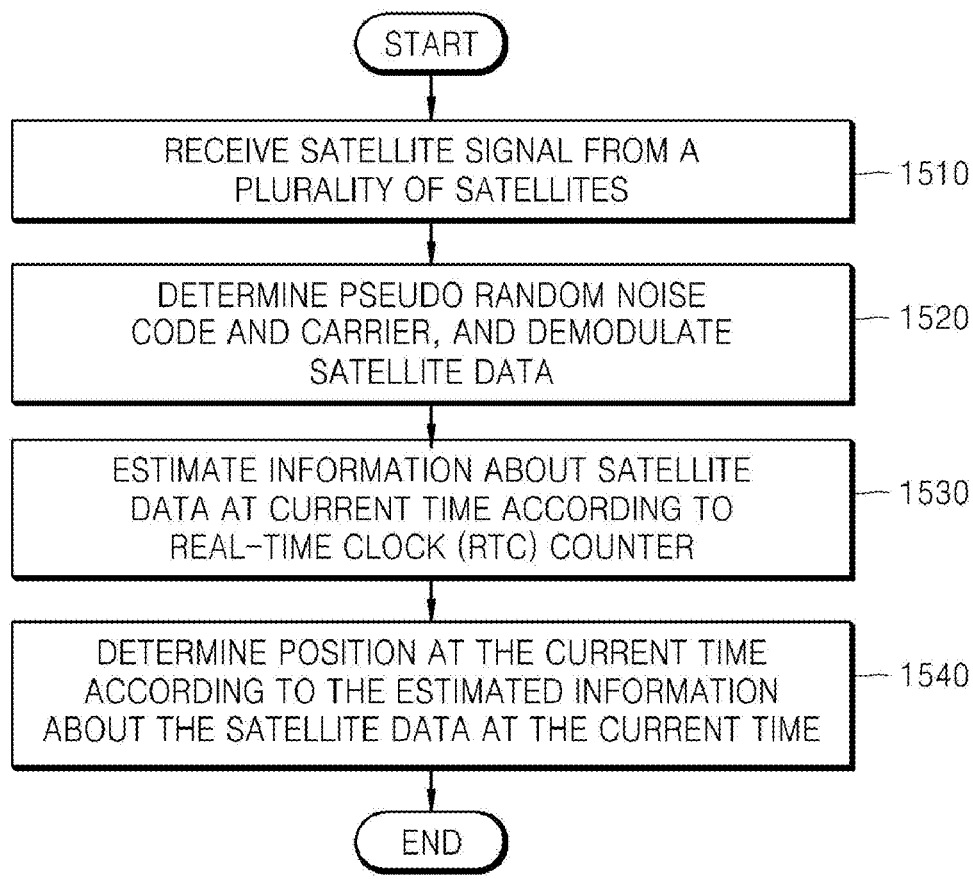
FIG. 15 is a flowchart of a fast position tracking method using a GPS, according to another embodiment of the present invention.

FIG. 15 is a flowchart of a fast position tracking method using a GPS, according to another embodiment of the present invention.

In operation 1510, a satellite signal is received from a plurality of satellites. The satellite signal is a mixture of a plurality of satellite signals from the plurality of satellites.

In operation 1520, satellite data received from a predetermined satellite from among the plurality of satellites is demodulated by using a pseudo random noise code and a carrier, which correspond to the satellite signal.

The predetermined satellite is searched for by using a correlation between the satellite signal and a reference signal according to the pseudo random noise code and the carrier, and the satellite data is demodulated from the received satellite signal. A code lock and a carrier lock may be declared when the predetermined satellite is found, and a bit lock may be declared when the satellite data is demodulated. By using information about satellite data stored at a previous time when a position tracking operation is ended, the search for the predetermined satellite may be skipped or the satellite data received from the predetermined satellite may be demodulated.

In the case where a position tracking operation is first initiated at a current time, it is necessary to search for satellites of all channels according to a 2D search method using a C/A code, and to demodulate satellite data.

In operation 1530, information about satellite data which is at the current time and which is from among the demodulated satellite data is estimated according to a current RTC counter.

By using the previously stored information about the satellite data at the previous time when the position tracking operation is ended, and the current RTC counter at the current time, the information about the satellite data at the current time may be estimated. The information about the satellite data at the previous time may include a bit counter, a word counter, a TOW counter, and an RTC counter which are at the previous time. By using the current RTC counter at the current time and counter information at the previous time, a current bit counter, a current word counter, and a current TOW counter may be estimated.

Although a GPS signal receiver is in a sleep mode, the RTC constantly operates so that an elapsed time period between the sleep mode and a reception mode may be immediately estimated when the GPS signal receiver is switched from the sleep mode to the reception mode.

In order to more precisely estimate the information about the satellite data at the current time, resolution of the RTC or a Doppler frequency may be considered, and thus, the information about the satellite data at the current time may be corrected.

In operation 1540, according to the estimated information about the satellite data at the current time, a position at the current time is determined. A pseudo range of the predetermined satellite may be measured by using the current bit counter, the current word counter, and the current TOW counter. The position at the current time may be determined according to a trilateration method using the pseudo range of the predetermined satellite. When the position tracking operation is ended and when power supply to the GPS signal receiver is shut-off, the current bit counter, the current word counter, the current TOW counter, and the RTC counter may be stored.

The embodiments of the present invention can be written as computer programs and can be implemented in general-use digital computers that execute the programs using a computer readable recording medium. In addition, a data structure used in the embodiments of the present invention can be written in a computer readable recording medium. Examples of the computer readable recording medium include magnetic storage media (e.g., ROM, floppy disks, hard disks, etc.), and optical recording media (e.g., CD-ROMs, or DVDs).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A fast position tracking method using a GPS (Global Positioning System), the fast position tracking method comprising:
   receiving a satellite signal from a plurality of satellites;
   demodulating satellite data received from a predetermined satellite from among the plurality of satellites by using a pseudo random noise code and a carrier, which correspond to the satellite signal;
   estimating information about satellite data which is at a current time and which is from among the demodulated satellite data according to an RTC (real-time clock) counter; and
   determining a position at the current time according to the information about the satellite data at the current time,
   wherein the estimating of the information comprises:
   performing a frame lock by using the demodulated satellite data before a next preamble signal for frame synchronization of the satellite data is received; and
   with respect to a frame which is of the satellite data and which is generated from the frame lock, estimating information about the frame at the current time.

2. The fast position tracking method of claim 1, wherein information about satellite data at a predetermined time comprises a bit counter, a word counter, a TOW (Time-of-Week) counter, and ephemeris data which are from the satellite data at the current time.

3. The fast position tracking method of claim 2, further comprising requesting information about satellite data at a previous time when a position tracking operation is ended.

4. The fast position tracking method of claim 3, wherein the demodulating of the satellite data comprises:
   determining the pseudo random noise code and the carrier which correspond to the predetermined satellite according to the requested information about the satellite data at the previous time; and
   demodulating the satellite data by using the determined pseudo random noise code and the determined carrier.

5. The fast position tracking method of claim 3, wherein the estimating of the information further comprises estimating the information about the satellite data at the current time according to the requested information about the satellite data at the previous time and the RTC counter at the current time.

6. The fast position tracking method of claim 1, wherein, when a position tracking operation using the GPS is first initiated,
   the demodulating of the satellite data comprises searching for the pseudo random noise code and the carrier, which correspond to the satellite signal, and demodulating the satellite data received from the predetermined satellite; and
   the determining of the position at the current time comprises synchronizing the demodulated satellite data in units of frames, determining the position at the current time by using the satellite data synchronized in the units of frames, and storing the information about the satellite data at the current time and the RTC counter at the current time.

7. The fast position tracking method of claim 1, further comprising storing information about the satellite data and the RTC counter which are at a power supply shut-off time after the position tracking operation is ended; and
   constantly maintaining an operation of the RTC counter.

8. The fast position tracking method of claim 1, further comprising updating information about the satellite data and the RTC counter at predetermined intervals after the position tracking operation is ended; and storing the updated information and the updated RTC counter.

9. The fast position tracking method of claim 2, further comprising updating the ephemeris data according to a validity of current ephemeris data.

10. The fast position tracking method of claim 9, wherein the updating of the ephemeris data comprises:
checking the validity of the current ephemeris data; and
when the current ephemeris data is invalid, demodulating satellite data from a newly received satellite signal, completing a new set of ephemeris data, and updating the ephemeris data.

11. The fast position tracking method of claim 1, wherein the determining of the position at the current time comprises:
estimating a pseudorange of the predetermined satellite by considering a difference between the RTC counter at the current time and at a GPS standard time;
searching for an intersection of pseudoranges of a predetermined number of satellites from among the plurality of satellites; and
determining the intersection of the pseudoranges of the predetermined number of satellites as the position at the current time.

12. The fast position tracking method of claim 11, wherein the estimating of the pseudorange comprises:
determining a difference between a frame synchronization time at a current position and a frame synchronization time at the predetermined satellite following the GPS standard time, and allowing the difference to follow the GPS standard time; and
determining the pseudorange of the predetermined satellite according to the difference between the frame synchronization times.

13. The fast position tracking method of claim 1, wherein the estimating of the information comprises determining an interval between the RTC counter at the current time and an RTC counter at a previous time by considering an error due to a resolution of the RTC.

14. The fast position tracking method of claim 2, wherein the estimating of the information comprises determining the bit counter, the word counter, and the TOW counter which are from the satellite data at the current time according to an interval between the RTC counter at the current time and the RTC counter at a previous time.

15. The fast position tracking method of claim 14, wherein the estimating of the information about the satellite data comprises correcting the bit counter and the word counter, which are from the satellite data at the current time, by considering Doppler information of the predetermined satellite.

16. The fast position tracking method of claim 15, wherein the correcting of the bit counter and the word counter comprises:
estimating a Doppler frequency at the current time by using the Doppler frequency of the predetermined satellite at the previous time when the position tracking operation is ended; and
correcting the bit counter and the word counter, which are from the satellite data at the current time, by considering an average value between the estimated Doppler frequency at the current time and the Doppler frequency at the previous time, and using Doppler information acquired when the pseudo random noise code and the carrier are determined.

17. A GPS (Global Positioning System) fast position tracking apparatus, comprising:
a GPS signal processing unit to receive a satellite signal from a plurality of satellites, to demodulate satellite data received from a predetermined satellite from among the plurality of satellites by using a pseudo random noise code and a carrier which correspond to the satellite signal, and to perform a frame lock by using the demodulated satellite data before a next preamble signal for frame synchronization of the satellite data is received;
a satellite information estimating unit to estimate information about a frame at a current time which is of the satellite data and which is generated from the frame lock, and to estimate information about the satellite data which is from among the demodulated satellite data and which is at the current time when a position tracking operation is performed, according to an RTC (real-time clock) counter of the GPS fast position tracking apparatus; and
a current position determining unit to determine a position at the current time according to the information about the satellite data at the current time.

18. A GPS (Global Positioning System) fast position tracking apparatus, comprising:
an RTC (real-time clock) to which power is constantly supplied;
a GPS (Global Positioning System) signal processing unit to receive a satellite signal from a plurality of satellites, to determine a pseudo random noise code and a carrier which correspond to the satellite signal, and to demodulate satellite data received from a predetermined satellite from among the plurality of satellites;
a power control unit to control power supplied to the GPS signal processing unit;
a storage unit to store information about the satellite data at a predetermined time;
a current position deriving unit to estimate information about the satellite data which is from among the demodulated satellite data and which is at a current time when a position tracking operation is performed, according to an RTC counter, and to determine a position at the current time according to the information about the satellite data at the current time; and
an RTC counter updating unit to update information about the satellite data and the RTC counter at predetermined intervals after the position tracking operation is ended, wherein the updated information about the satellite data and the updated RTC counter are stored in the storage unit.

19. A non-transitory computer readable recording medium having recorded thereon a program for executing the fast position tracking method of claim 1.

* * * * *